(12) United States Patent
Schmidt et al.

(10) Patent No.: US 6,627,126 B2
(45) Date of Patent: Sep. 30, 2003

(54) METHOD FOR PREPARING REFRACTORY CARBIDES

(75) Inventors: Wayde R. Schmidt, Pomfret Center, CT (US); Donald C. Giedt, Morgan Hill, CA (US)

(73) Assignee: United Technologies Corporation, Hartford, CT (US)

( * ) Notice: Subject to any disclaimer, the term of this patent is extended or adjusted under 35 U.S.C. 154(b) by 1 day.

(21) Appl. No.: 09/906,198

(22) Filed: Jul. 16, 2001

(65) Prior Publication Data
US 2003/0132558 A1 Jul. 17, 2003

(51) Int. Cl.$^7$ ............................................. C01B 31/00
(52) U.S. Cl. ...................... 264/29.1; 264/625
(58) Field of Search ........................ 264/29.1, 29.7, 264/625

(56) References Cited

U.S. PATENT DOCUMENTS 3,947,550 A * 3/1976 Fitchmun
4,126,652 A 11/1978 Oohara et al.
5,494,867 A 2/1996 Schwaby et al.
5,698,143 A * 12/1997 Tani et al.
6,120,840 A 9/2000 Paul et al.

* cited by examiner

Primary Examiner—Christopher A. Fiorilla
(74) Attorney, Agent, or Firm—Bachman & Lapointe, P.C.

(57) ABSTRACT

A method for preparing a refractory carbide component includes the steps of providing a carbon rich polymer precursor to silicon carbide and excess carbon, determining an amount of excess carbon in the carbon rich polymer precursor, combining the carbon rich polymer precursor with a selected amount of refractory metal to form a precursor/metal mixture, the selected amount being selected so as to provide stoichiometrically equivalent amounts of the excess carbon and the refractory metal, forming the mixture into a preform of a propulsion component, and heating the preform so as to thermally degrade the carbon rich polymer precursor to produce the silicon carbide and the excess carbon, the excess carbon and the refractory metal reacting to form refractory metal carbide and provide the refractory carbide component.

21 Claims, 12 Drawing Sheets

METHOD FOR PREPARING REFRACTORY CARBIDES

BACKGROUND OF THE INVENTION

The invention relates to a method for preparing refractory carbides and, more particularly, to a method for preparing ceramic-matrix composites containing refractory carbides which are particularly well suited for high temperature propulsion applications and the like.

Refractory carbides and composites containing refractory carbides are useful in high temperature, high stress applications, for example in propulsion applications.

Conventional processing for manufacturing refractory carbides requires extremely high temperatures.

Ceramic-matrix composites are particularly desirable for high-temperature applications such as propulsion applications and the like. However, preparation of such composite ceramic materials is difficult, and frequently leads to excess carbon or refractory metal, neither of which is desirable since the excess carbon can cause oxidation problems and excess refractory metals lead to extra weight of the resulting component. Excess refractory metals can also disadvantageously react with common composite reinforcement phases, such as carbon fiber.

It is therefore the primary object of the present invention to provide a method for preparing refractory carbides which can be carried out at lower temperatures than conventionally possible, and which allows preparation of high temperature propulsion components with desirable properties.

It is a further object of the present invention to provide such a method which allows for preparation of refractory carbides at reduced cost.

It is still another object of the present invention to provide a method whereby composite refractory carbide structures are prepared.

Other objects and advantages of the present invention will appear hereinbelow.

SUMMARY OF THE INVENTION

In accordance with the present invention, the foregoing objects and advantages have been readily attained.

According to the invention, a method is provided for preparing a refractory carbide component, which method comprises the steps of providing a carbon rich polymer precursor to silicon carbide and excess carbon; determining an amount of excess carbon in said carbon rich polymer precursor; combining said carbon rich polymer precursor with a selected amount of refractory metal to form a precursor/metal mixture, said selected amount being selected so as to provide stoichiometrically equivalent amounts of said excess carbon and said refractory metal; forming said mixture into a preform of a propulsion component; and heating said preform so as to thermally degrade said carbon rich polymer precursor to produce said silicon carbide and said excess carbon, said excess carbon and said refractory metal reacting to form refractory metal carbide and provide said refractory carbide component.

Suitable refractory metals include hafnium, tantalum, titanium, silicon, tungsten, zirconium and mixtures thereof, and the residual carbon generated by thermal degradation of the carbon rich polymer precursor reacts with such refractory metal to provide a final material containing substantial amounts of silicon carbide and other refractory metal carbide.

BRIEF DESCRIPTION OF THE DRAWINGS

A detailed description of preferred embodiments of the present invention follows, with reference to the attached drawings, wherein.

DETAILED DESCRIPTION

Figure 1:
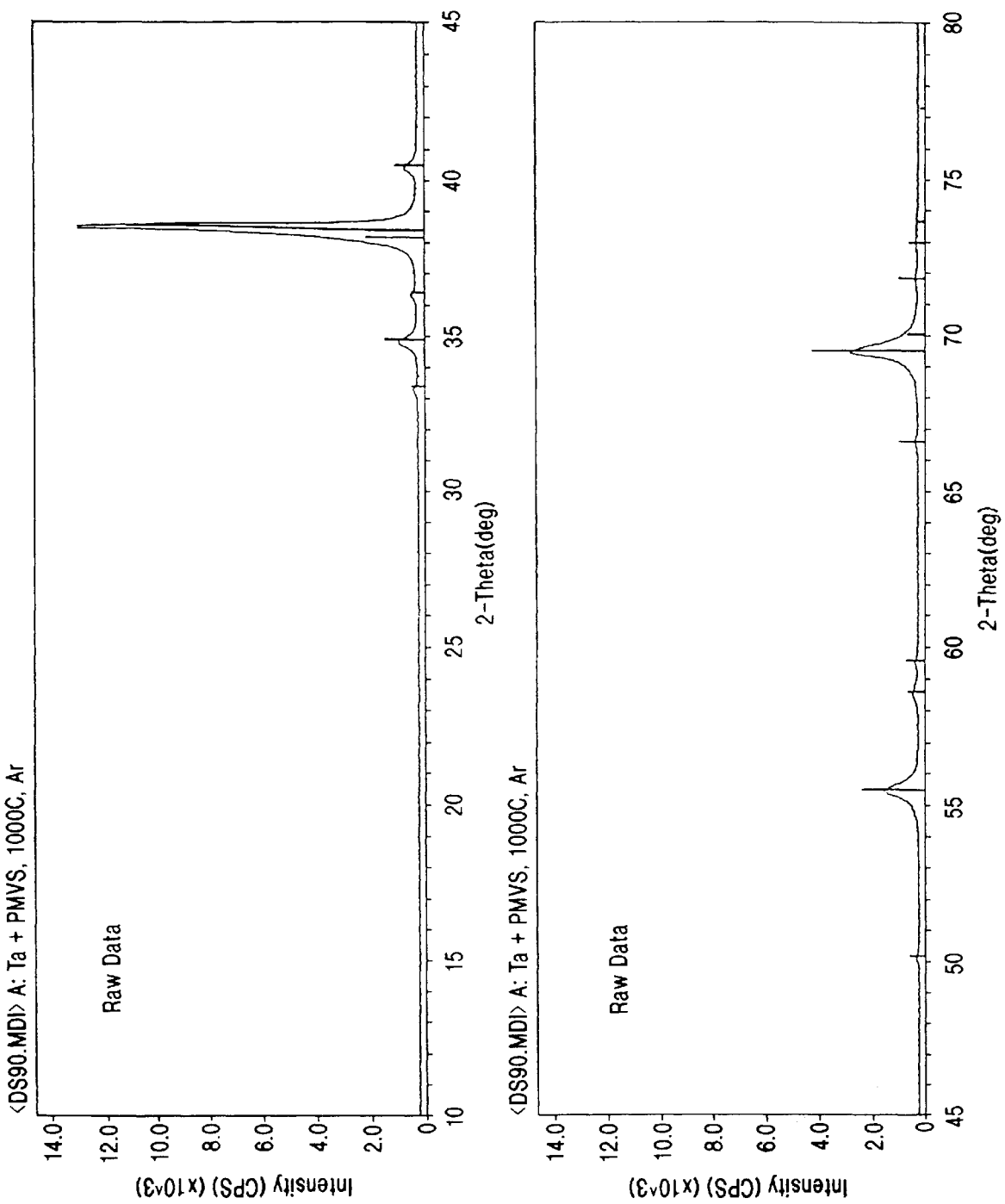
FIG. 1 illustrates results of thermal degradation of a polymer precursor with tantalum after being heated to 1000° C.

The invention relates to the preparation of refractory carbides and ceramic-matrix composites containing same using carbon-rich polymeric precursors to silicon carbide. The precursor is mixed with refractory metals such as hafnium, tantalum, titanium, silicon, tungsten, zirconium and mixtures thereof, and reacted such that silicon carbide and other refractory metal carbides are formed. These composites and carbides are formed in a manner particularly well suited for use in manufacturing components for high temperature propulsion systems and applications.

Certain polymers are useful as precursors to ceramic or refractory carbide materials. Polymers which thermally decompose to ceramic, metal or mixed phases are described as "preceramic oligomers or polymers", or "oligomeric or polymeric precursors". Synthesis and conversion of these types of materials can be carried out for a variety of oxide and nonoxide ceramics and for other metal-doped ceramics systems.

In accordance with the present invention, carbon rich polymer precursors are mixed with additional refractory metal so as to provide a precursor/metal mixture, and the mixture is then heated to a temperature sufficient to thermally degrade the precursor, thereby forming refractory carbides as desired.

As set forth above, for propulsion applications, it is desirable to reduce or eliminate excess carbon or metal in the final component. In accordance with the invention, polymer precursor is advantageously analyzed, for example using thermal degradation under an inert atmosphere, to determine the amount of excess carbon in that precursor. An equivalent molar amount of refractory metal is then selected and mixed with the initial precursor so as to provide a mixture that will react when heated so as to react substantially all of the excess carbon with substantially all refractory metal so as to provide a final component having little or no remaining unreacted excess carbon or refractory metal. Thus, in accordance with the invention, the polymer precursor and refractory metal are advantageously mixed so as to provide a molar ratio of excess or residual carbon to refractory metal of about 1.

In accordance with the present invention, the polymer precursor is preferably a polymer precursor to silicon carbide, and the additional metals are preferably refractory metals, more preferably refractory metals selected from the group consisting of hafnium, tantalum, titanium, silicon, tungsten, zirconium and mixtures thereof, and the heating step causes the precursor to thermally degrade and produce silicon carbide and residual carbon. The residual carbon advantageously reacts with the additional refractory metal to form further refractory carbides.

In further accordance with the invention, it may be desirable to provide a mixture of two or more precursors to carbon-rich silicon carbide, and/or to provide a first precursor to stoichiometric silicon carbide, with no excess carbon, and a second precursor to carbon only. In either event, the starting precursor materials are analyzed in accordance with the present invention so as to determine the amount of excess carbon that will be generated such that excess carbon can be stoichiometrically balanced with the refractory metal.

Depending upon the form of additional reinforcement phases, such as particulate, chopped fiber, nonwoven fibers, woven or braided fibers, as well as the forming operation, the end result is a monolithic refractory carbide composite or alternatively reinforced composite which has desirable characteristics, and which is prepared at reduced cost and relatively lower temperature.

The carbon rich polymer precursor to be used in accordance with the present invention is preferably any suitable polymer precursor to silicon carbide which can be prepared so as to also generate residual or excess carbon or which can be mixed with a different precursor to carbon. One example of a particularly preferred carbon rich polymer precursor is poly(methylvinlysilane), or PMVS, which is particularly desirable because the precursor chemistry can be tailored to obtain desirable compositions of the silicon carbide which results from thermal degradation. Further, the starting materials for PMVS can be cured through a variety of mechanisms such as chemical curing, exposure to radiation, thermal/heat methods and the like.

Further, PMVS is susceptible to polymer infiltration and pyrolysis treatment methods which successfully increase density and reduce porosity of the resulting material which is desirable when preparing ceramic-matrix composites. PMVS is also compatible with both ceramic and metal powders, depending upon the surface chemistry of the powders, and is available in liquid form or can be dissolved in a suitable solvent, either way facilitating delivery of this material as a liquid. Finally, PMVS is susceptible to control of the "char yield" or mass of ceramic residue that remains following thermal degradation, which advantageously helps to allow balancing of the excess carbon and refractory metal as desired. Of course, other polymer precursors to silicon carbide, and mixtures of precursors to silicon carbide and/or carbon, can be used in accordance with the present invention, as well.

In accordance with the present invention, the desired carbon rich polymer precursor is advantageously provided so as to be rich in carbon, and is analyzed to determine or measure an expected amount of excess carbon, such that thermal degradation of the precursor will result in formation of silicon carbide and a known amount of residual carbon.

The additional refractory metal which is combined with the precursor in accordance with the present invention is selected and added so as to provide a final material containing the desired carbides. Preferred metals are refractory metals, more preferably selected from the group consisting of hafnium, tantalum, titanium, silicon, tungsten, zirconium and mixtures thereof. Of these, hafnium and tantalum are particularly desirable. The refractory metals are advantageously provided in powder form. These metals are advantageous in that they have a melting temperature which is higher than the temperature at which the polymer precursor thermally degrades. This advantageously allows for heating of a polymer precursor/refractory metal mixture to cause the polymer precursor to thermally degrade without melting the refractory metal powder.

As set forth above, the polymer precursor and refractory metal are added, in accordance with the present invention, in amounts so as to match the refractory metal with the amount of expected residual carbon to be generated when the polymer precursor is thermally degraded. Thus, these components are preferably mixed in stoichiometric amounts, at a molar ratio of expected residual carbon to refractory metal of about 1, and additional heating after thermally degrading of the polymer precursor reacts the additional refractory metal with the generated residual carbon so as to provide further refractory metal carbides in the end product, without substantial amounts of excess unreacted carbon or metal.

It should be appreciated that when the additional refractory metal is silicon, the end product will be primarily silicon carbide, while use of other refractory metals will provide a composite refractory carbide containing silicon carbide and other carbides as desired.

As set forth above, the polymer precursor can be provided in solid or liquid form. Liquid form is preferable so as to facilitate good mechanical mixing with the refractory metal powder. However, polymer precursor in dry form is also suitably converted to liquid form, for example by mixing with a solvent such as toluene or the like.

The polymer precursor and refractory metal are advantageously mechanically mixed so as to provide a substantially homogeneous mixture. The mixture is then heated to sufficient temperatures so as to thermally degrade the polymer precursor without reaching the melting point of the refractory metal powder. The heating step is preferably carried out so as to reach a temperature of about 1000° C., which is a temperature sufficient to cause thermal degrading of the polymer precursor. However, heat treatments at temperatures below 1000° C. and above the curing temperature or the polymer can advantageously render the polymer/refractory metal mixture suitably rigid for ease and handling prior to additional treatment. Heating may further preferably be carried out so as to reach a temperature of approximately 1200° C., more preferably about 1400° C., and ideally about 1600° C. Heating is preferably carried out under an inert atmosphere, for example, argon.

Heating is further preferably carried out by increasing the temperature at a rate of about 1–10° C. per minute, preferably about 2° C. per minute. Once reaching the temperature of 1000° C., further heating to higher temperatures may suitably be carried out at a rate of about 10° C. per minute. This heating may advantageously be carried out under an argon atmosphere, and the desired temperature is preferably held for at least 0.5 hours, preferably between about 0.5 hours and about 5 hours and most preferably about 2 hours.

Heating as described advantageously causes the polymer precursor to degrade to the desired silicon carbide and residual carbon, while not melting the additional refractory metal, such that the refractory metal can react with the residual carbon and form additional refractory carbides. This is accomplished at temperatures significantly lower than conventional refractory carbide forming steps. Further, the resulting materials are well suited for use in propulsion and other high-temperature, high-stress environments.

A particularly advantageous application of the present invention is fabrication of components for high temperature propulsion applications such as rocket components, for example engine throats, nozzles and exit cones and the like, as the process allows manufacture of such components without the potential oxidation risk of unreacted excess carbon, without the undesirable added weight of unreacted refractory metal and without the undesirable reaction of excess refractory metal with typical composite reinforcement phases such as carbon fiber.

In order to fabricate such components, the polymer precursor/metal mixture may advantageously be processed into a preform of the component before heating to degradation temperatures. The preforming step may include heating to an extent that the preform is provided before heating sufficient to react excess carbon with the refractory metal if desired.

The heating steps for forming the component can alternatively be carried out in a single step so as to prepare the desired ceramic-matrix composite component.

The preform may advantageously be provided by infiltrating the polymer/metal mixture into a fiber preform in known manner such that subsequent heating/pyrolysis provides the desired ceramic-matrix composite component. Suitable fiber preforms include non-continuous (chopped) or continuous, woven, nonwoven, or braided structures typically having ceramic or carbon fibers. Most preferably, the fiber preform is a woven or braided structure of substantially continuous carbon fiber.

The following examples further demonstrate preparation of materials using the method of the present invention.

EXAMPLE 1

This example demonstrates preparation of a silicon carbide, hafnium carbide composite material.

A PMVS polymer precursor was prepared, and a portion was analyzed after thermal degradation in an argon atmosphere to produce silicon carbide and excess carbon. The polymer degraded with loss of low molecular weight material and other volatile decomposition products to yield ceramic char in a 45% weight yield. The amount of excess carbon in the char was determined analytically to be nominally 20% weight, and this corresponds to approximately 0.75 molar excess of carbon in the char. The remaining PMVS was mixed with an equivalent molar amount of hafnium by mechanical mixing. The resulting metal-filled polymer was then processed into a fibrous preform and thermally cured and degraded. The resulting product was a solid matrix, surrounding the fibrous reinforcement phase, and was produced and comprised of silicon carbide and hafnium. Additional heating or high temperature processing causes the refractory metal to react with excess carbon to form hafnium carbide (HfC). The resulting matrix thereby contains silicon carbide and hafnium carbide surrounding a fibrous reinforcement phase.

This composite carbide is prepared at temperatures substantially lower than those required following conventional processes, and provides components having little or no remaining unreacted carbon or hafnium.

EXAMPLE 2

This example demonstrates preparation of a silicon carbide, tantalum carbide material according to the method of the present invention.

Four grams of polymethylvinylsilane (PMVS) were dissolved in toluene, and then 7.2 grams of tantalum metal (Cerac, −325 mesh) were added to the solution. The tantalum metal did not dissolve and remained in particulate form. This polymer solution plus particulate mixture was then mechanically stirred with a magnetic stirrer, and the toluene was removed by vacuum and heating on a rotary evaporator. The isolated solid/polymer was removed from the rotary flask and placed in a fused silica boat within a fused silica furnace tube equipped with gas inlet and outlet valves. The polymer/metal mixture was thermally treated under flowing argon atmosphere.

The sample was initially pyrolyzed in argon up to 1000° C. and held at that temperature for 1–4 hours. Heating and cooling rates were 2° C. per minute. The isolated char material was black, and was then further heated at a heating rate of 10° C. per minute to 1200° C., 1400° C. and 1600° C. Samples processed at each temperature were analyzed using x-ray powder detraction (XRD) on isolated samples.

FIG. 1 shows the XRD analysis for the 1000° C. sample, and indicates that the sample contained primarily unreacted tantalum metal, as well as minor amounts of tantalum carbide TaC and $Ta_2C$ ceramic phases, in addition to poorly crystalline carbon and silicon carbide.

Figure 2:
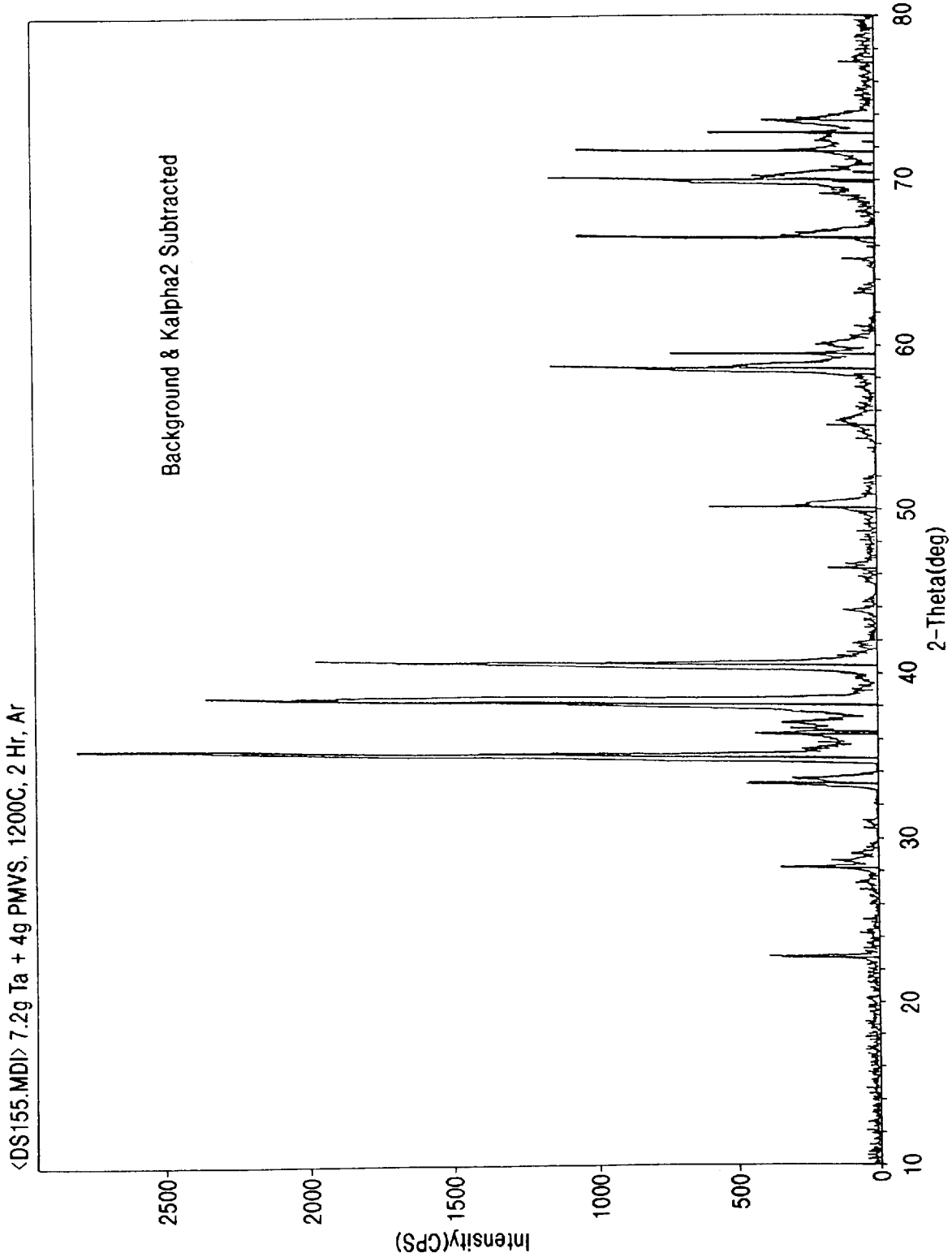
FIGS. 2 and 3 show XRD analysis after heating to 1200° C.
Figure 3:
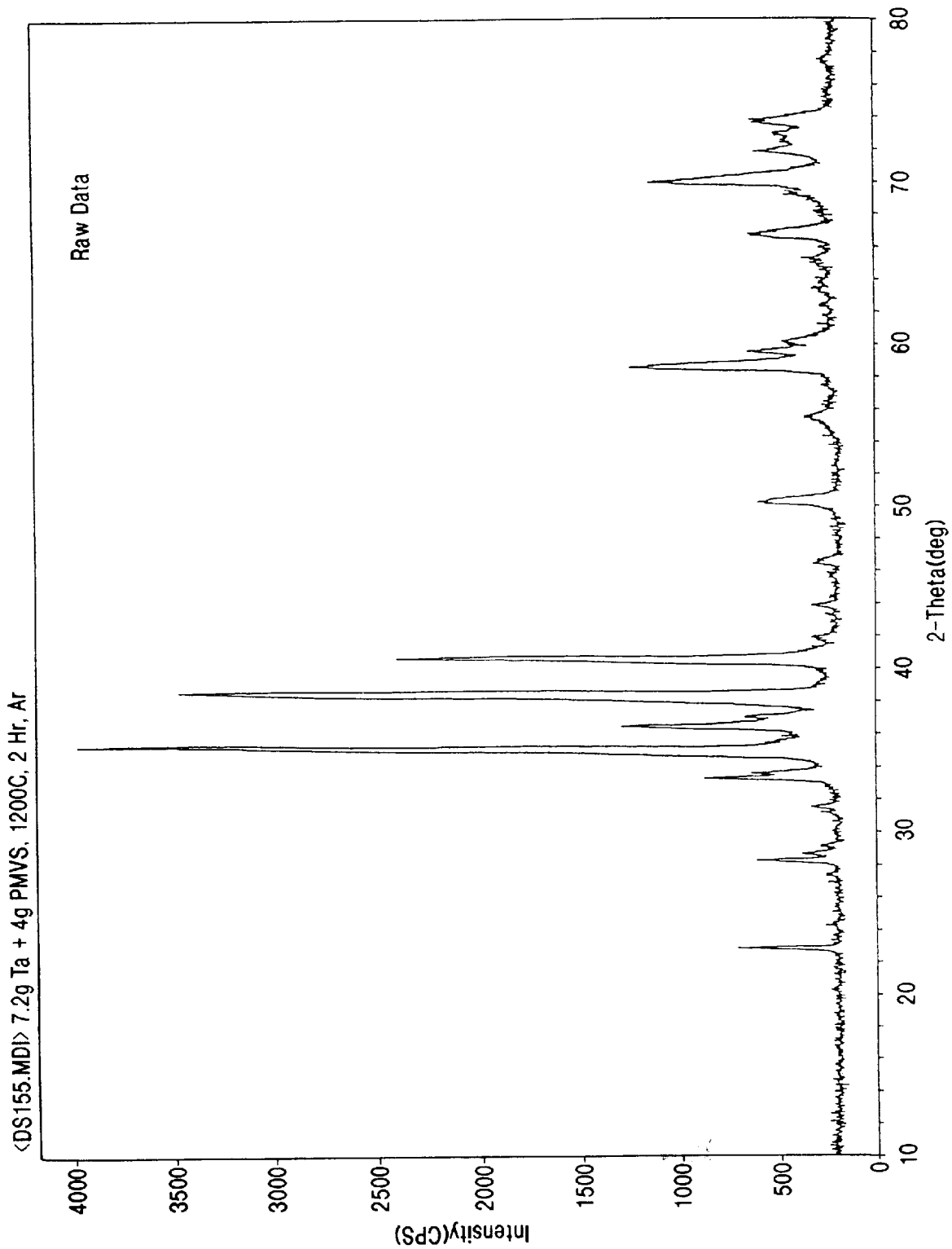

FIGS. 2 and 3 show XRD analysis for the sample heated to 1200° C., and show that no residual tantalum is present, that major amounts of TaC and $Ta_2C$.

Figure 4:
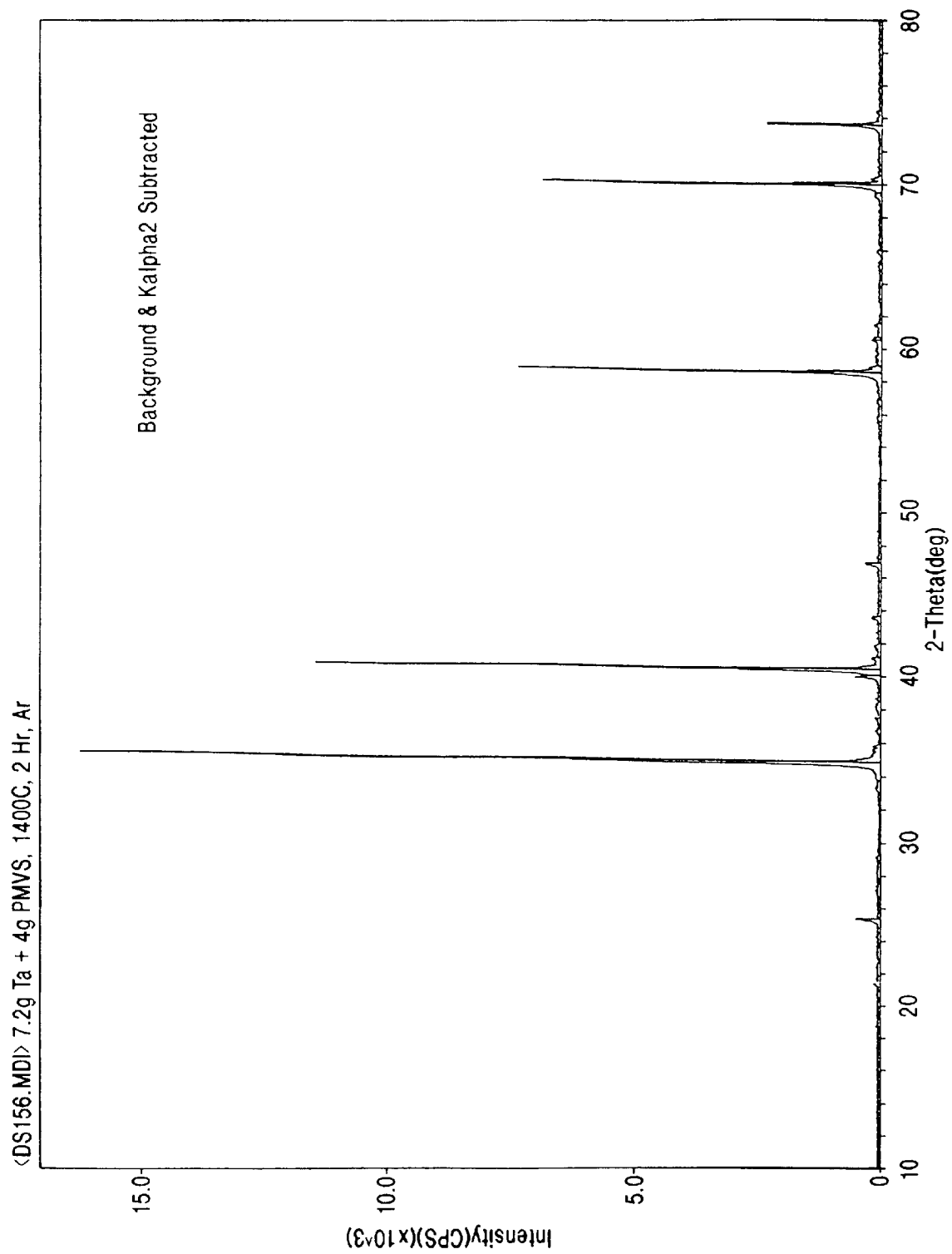
FIGS. 4 and 5 show XRD analysis after heating to 1400° C.
Figure 5:
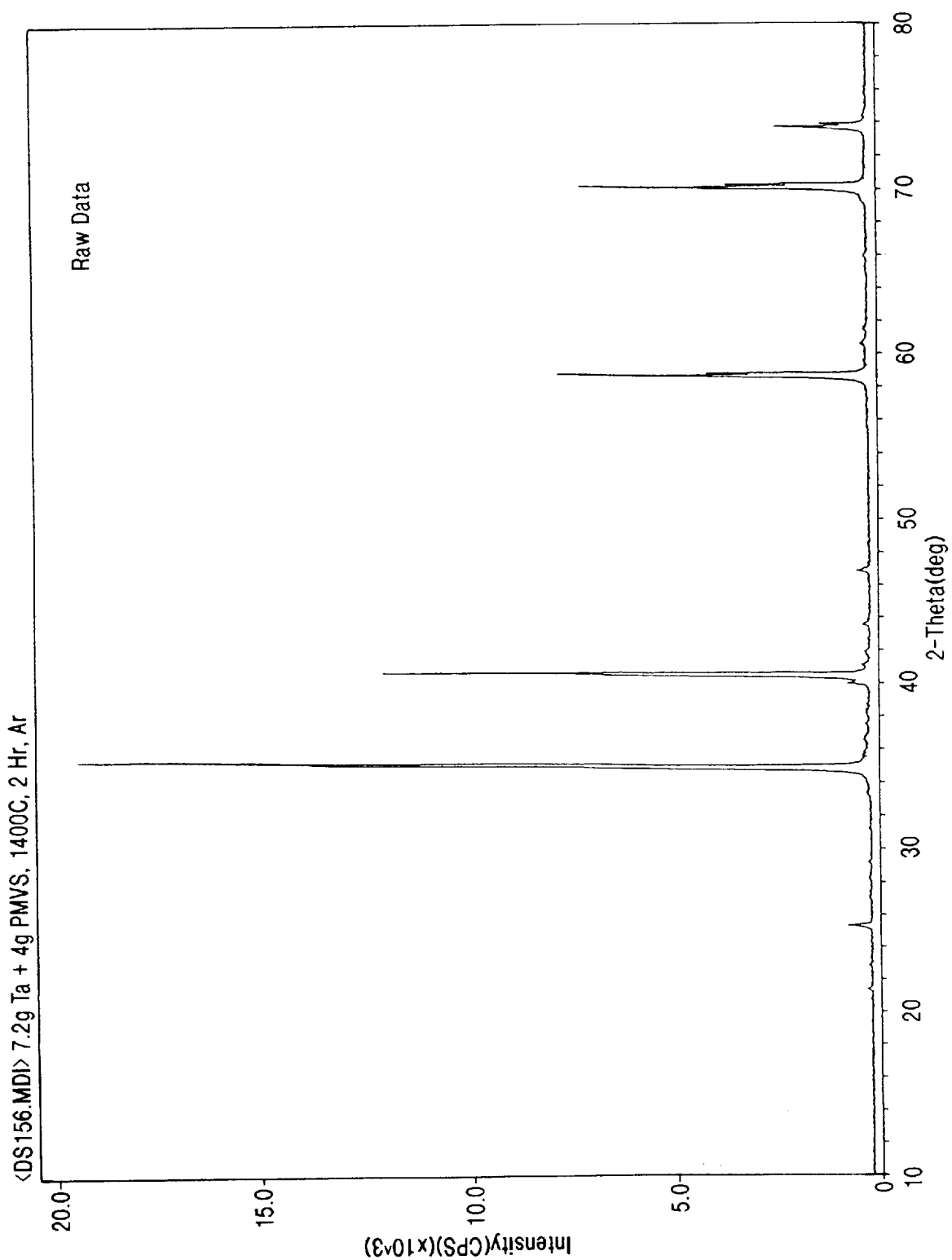

FIGS. 4 and 5 show XRD analysis for the sample treated to 1400° C., and shows essentially all tantalum carbide (TaC), with minor amounts of $TaSi_2$.

Figure 6:
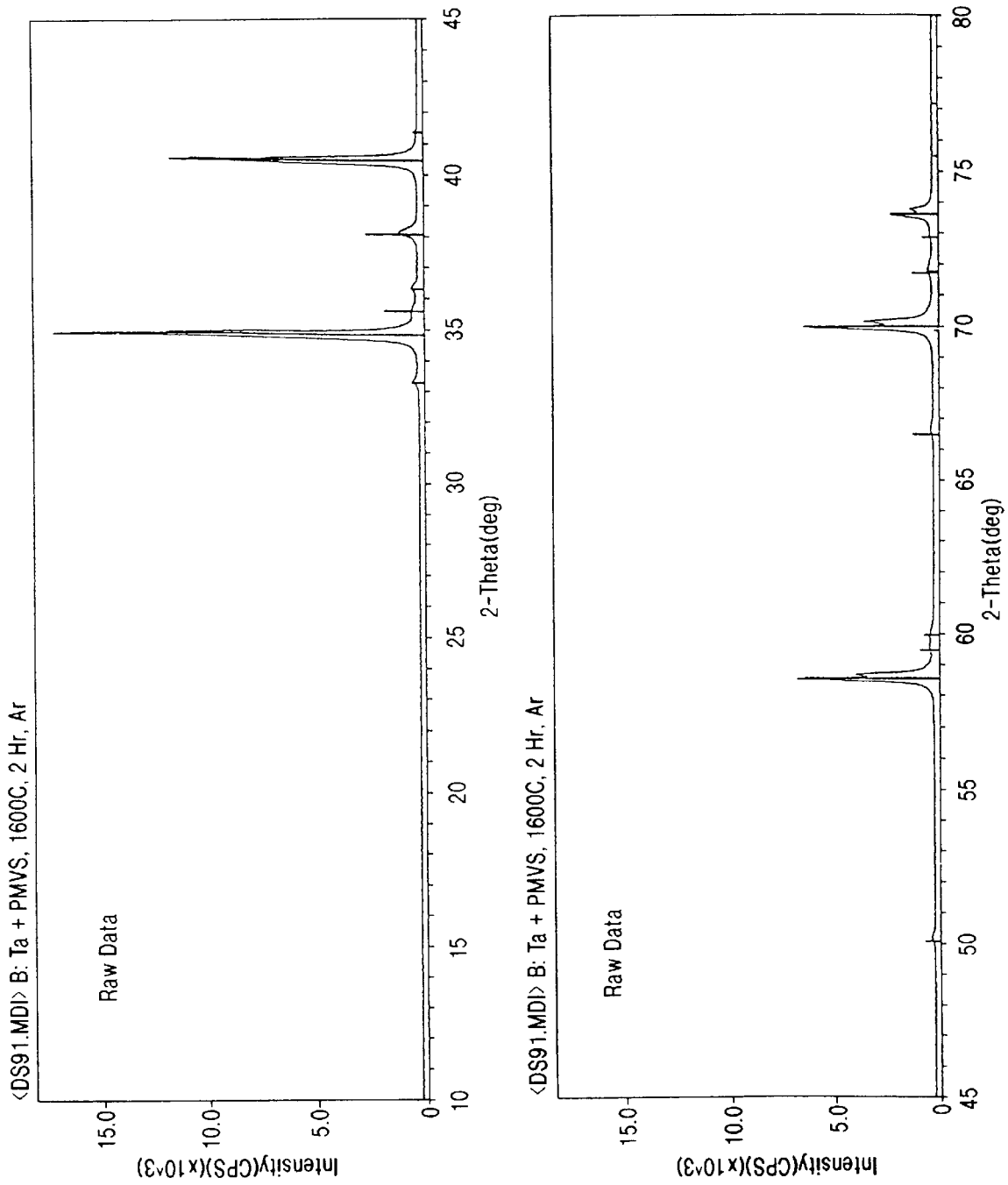
FIG. 6 shows XRD analysis after heating to 1600° C.

Finally, FIG. 6 shows XRD analysis for the 1600° C. sample, and shows TaC as the major phase, with $Ta_2C$ as a minor phase and silicon carbide. Thus, a composite refractory carbide material is prepared in accordance with the present invention, and results in substantial amounts of silicon carbide and tantalum carbide as desired.

EXAMPLE 3

In this example, preparation of silicon carbide and hafnium carbide is further illustrated.

Four grams of PMVS were mixed with toluene and mixed with a residual carbon molar equivalent amount, 7.0 grams, of hafnium metal in powder form (Cerac,−325 mesh). The PMVS/hafnium mixture was pyrolyzed to temperatures of 1000° C., 1200° C., 1400° C. and 1600° C.

Figure 7:
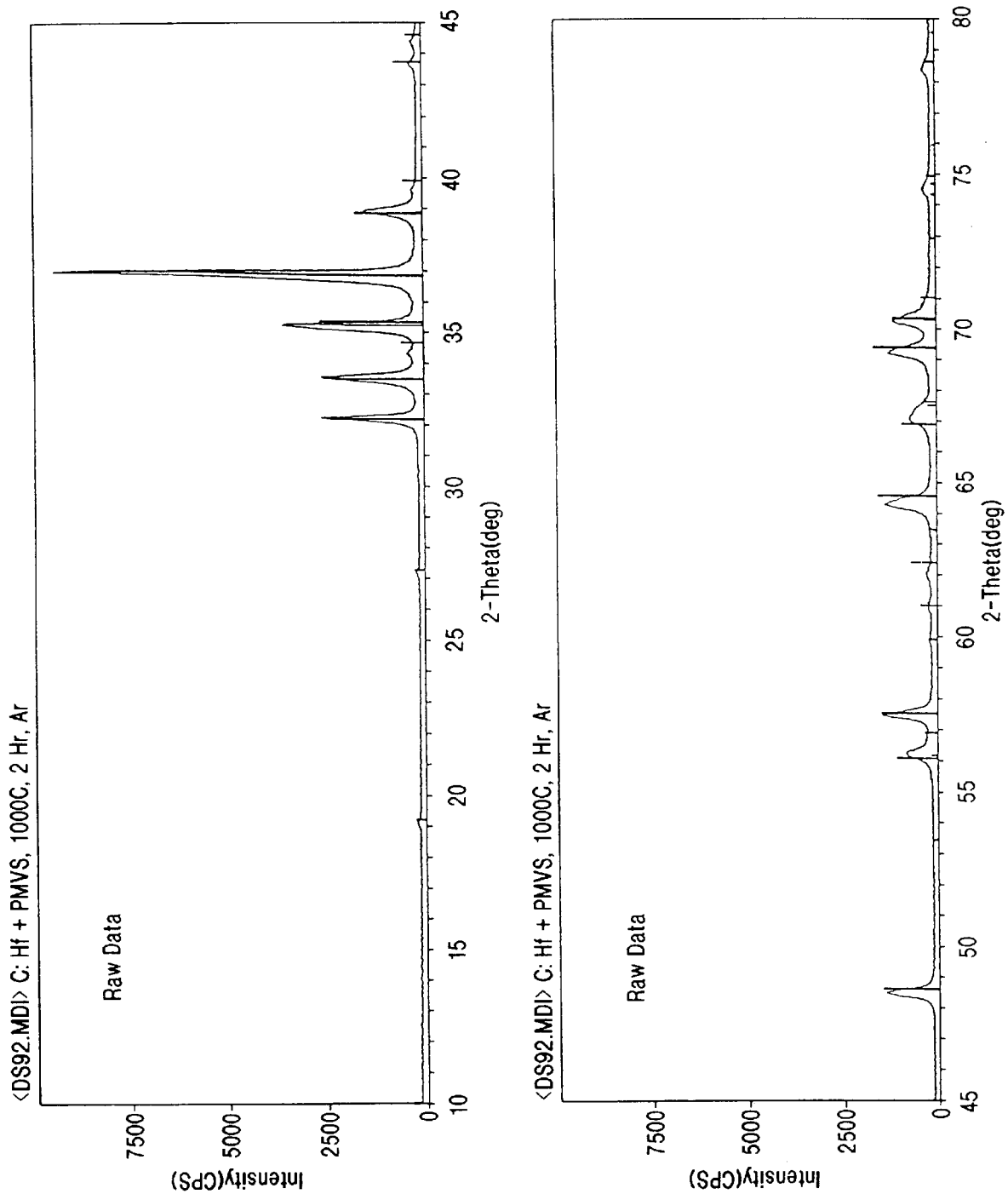
FIG. 7 shows XRD analysis for a polymer precursor with hafnium after heating to 1000° C.
Figure 8:
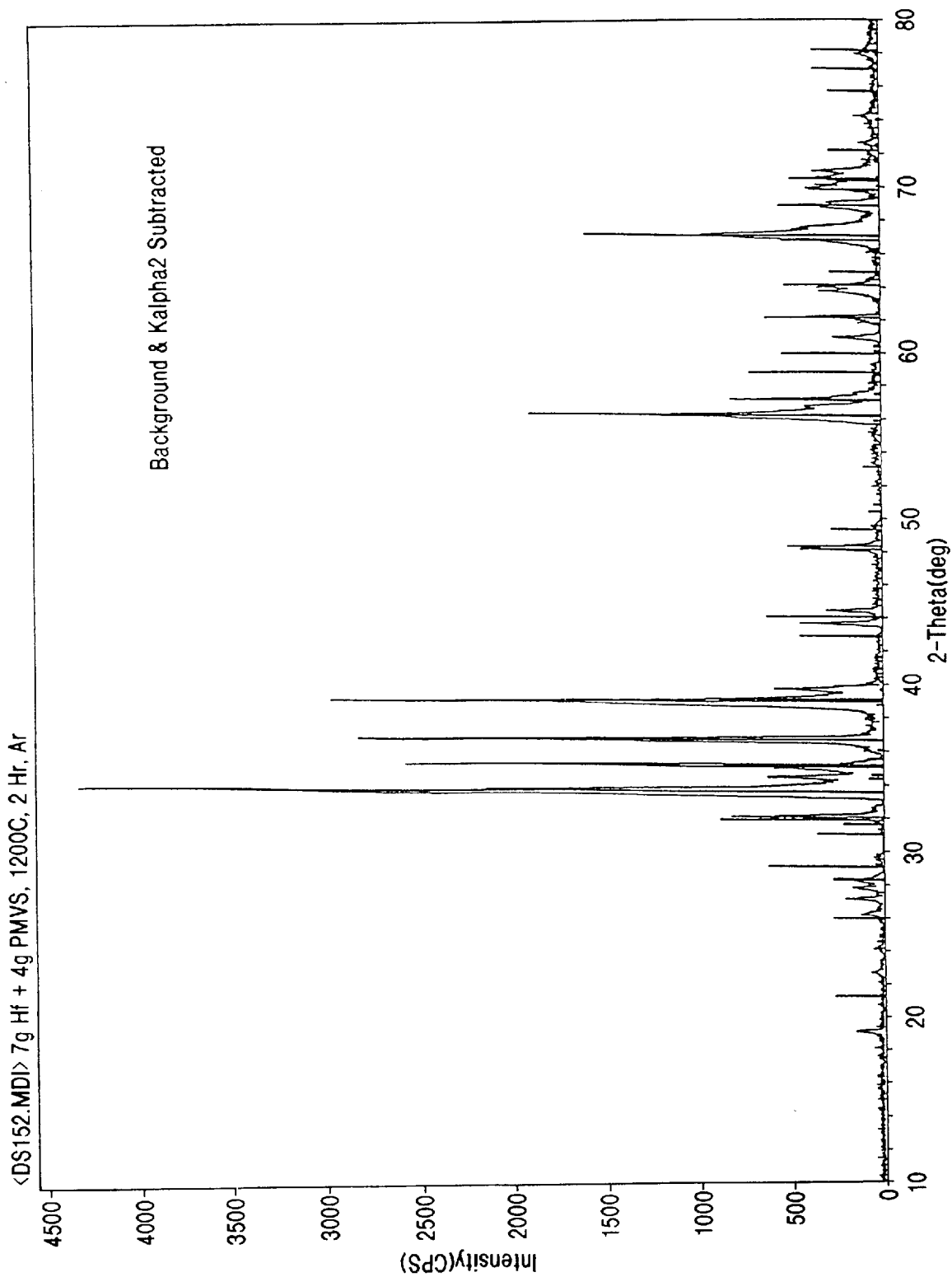
FIGS. 8 and 9 show XRD analysis after heating to 1200° C.
Figure 9:
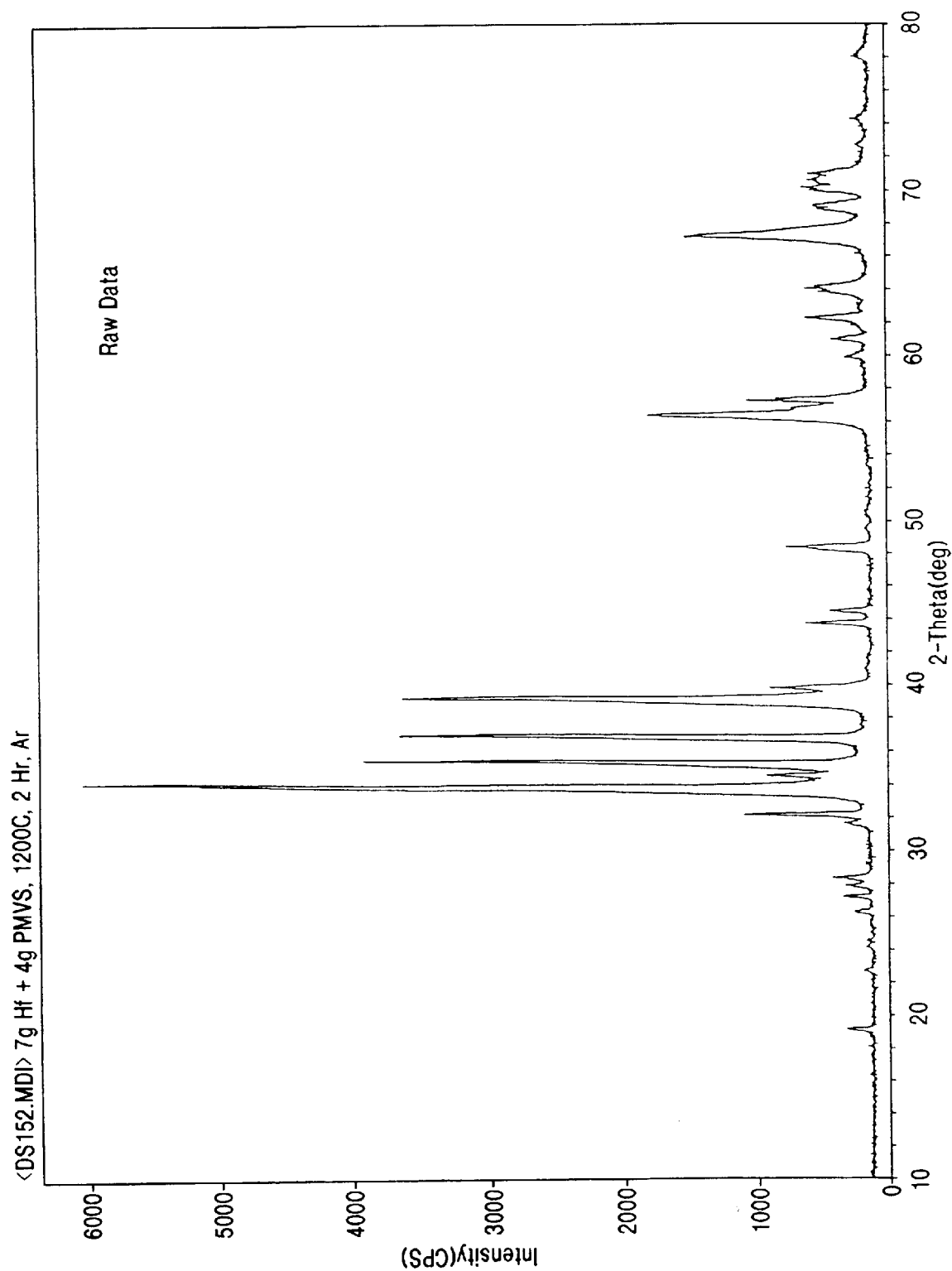

As in Example 2, the samples were analyzed using XRD analysis, and FIG. 7 shows XRD analysis for this material after treatment at 1000° C. The sample after treatment at this temperature contains significant amounts of unreacted hafnium metal, and minor amounts of crystalline hafnium carbide. The sample treated to 1200° C. shows a decreased amount of unreacted hafnium, and significant increase in the concentration of hafnium carbide. See FIGS. 8 and 9.

Figure 10:
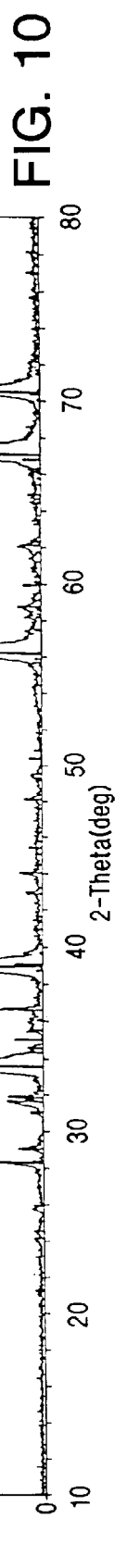
FIGS. 10 and 11 show XRD analysis after heating to 1400°.
Figure 11:
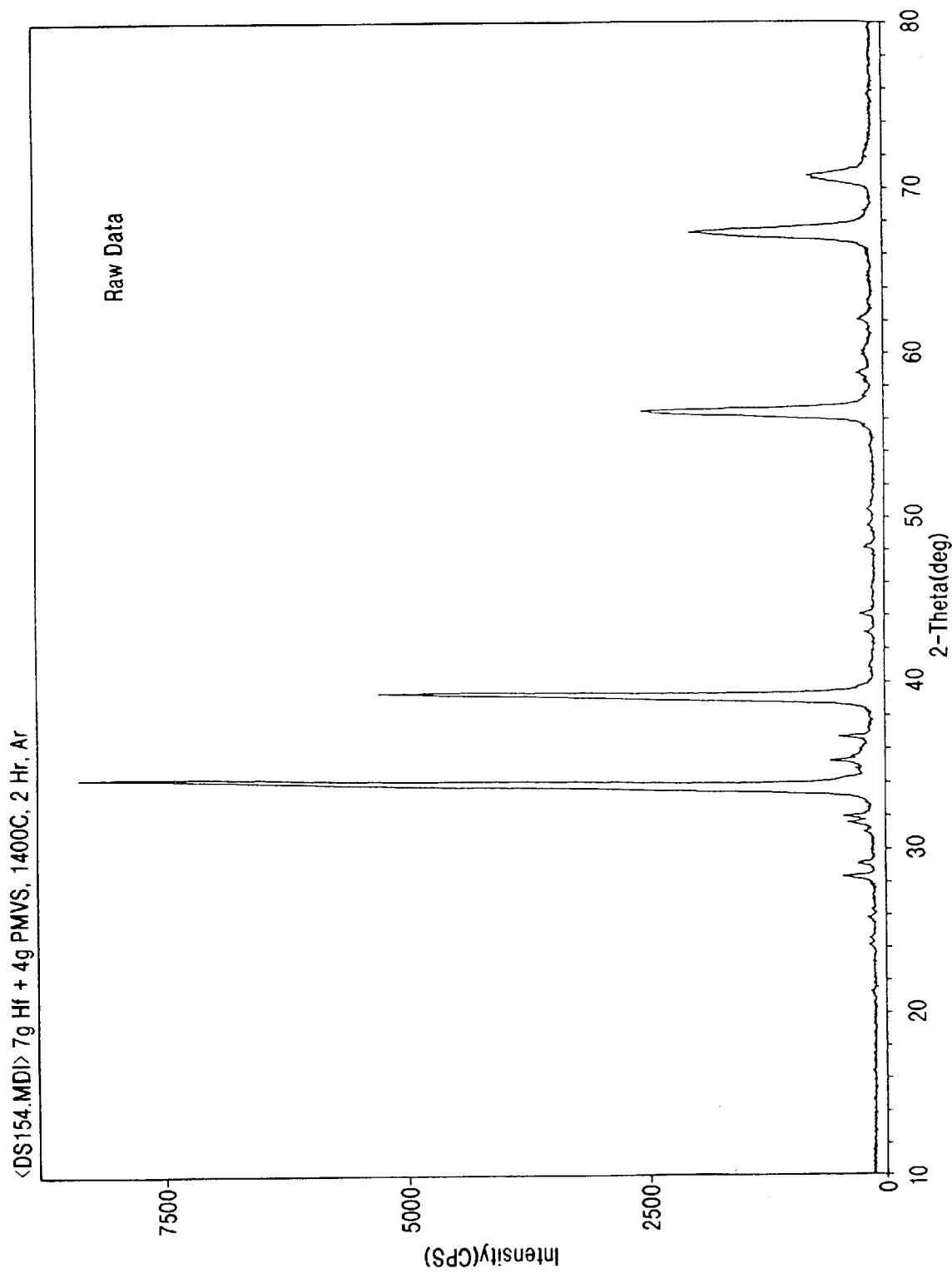
Figure 12:
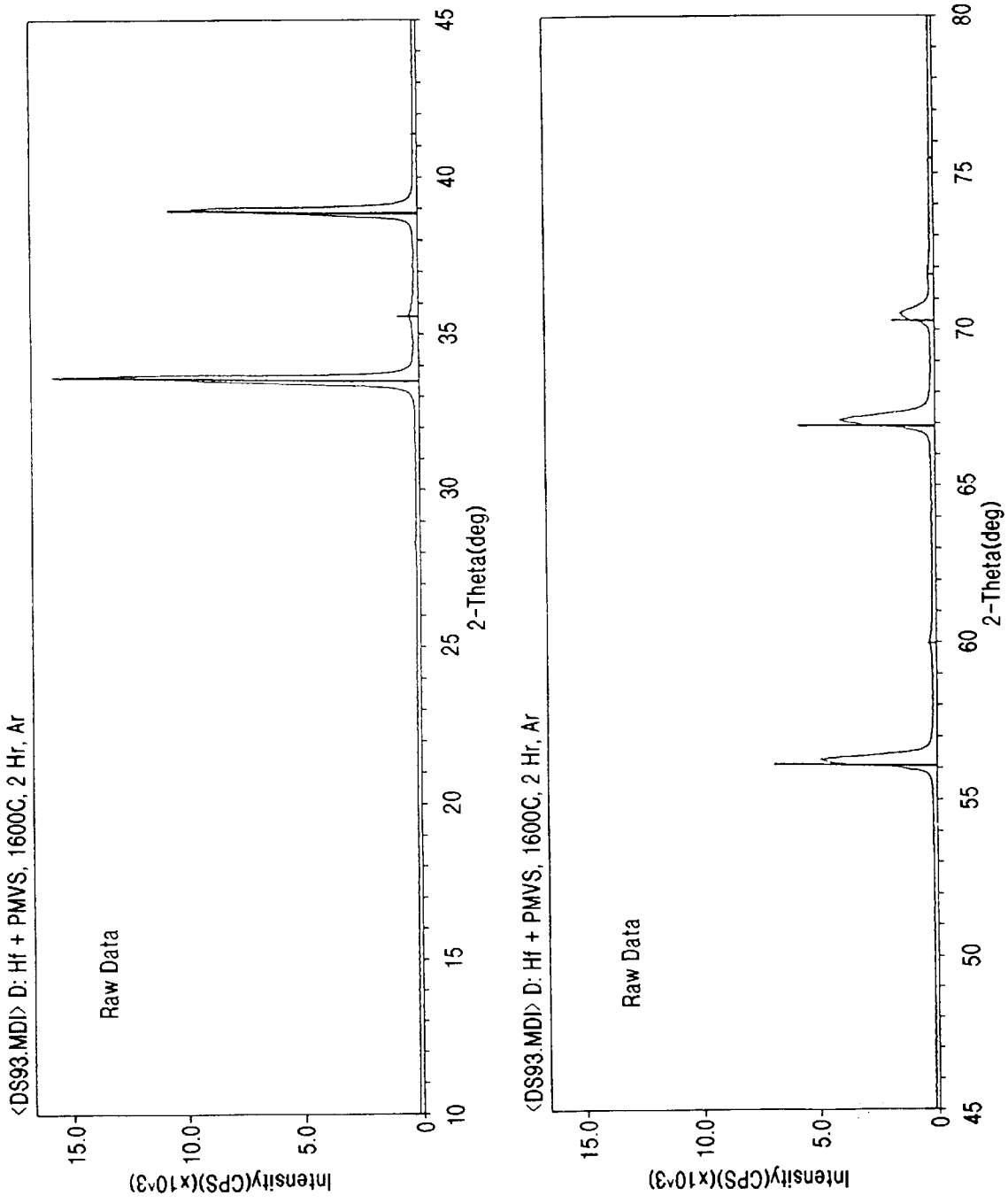
FIG. 12 shows XRD analysis after heating to 1600° C.

FIGS. 10 and 11 show XRD analysis for the sample treated at 1400° C., and FIG. 12 shows XRD analysis for the sample treated to 1600° C., and each of these samples shows hafnium carbide as the primary phase, with additional measurable amounts of silicon carbide as desired.

It should of course be appreciated that the method of the present invention allows for preparation of these materials at significantly lower temperatures than conventional processing routes to such materials would allow.

Further, the method of the present invention allows for preparation following a method which is cost effective and efficient in providing desirable results.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for preparing a refractory carbide component, comprising the steps of:
   providing a carbon rich polymer precursor to silicon carbide and excess carbon;
   determining an amount of excess carbon in said carbon rich polymer precursor;
   combining said carbon rich polymer precursor with a selected amount of refractory metal to form a precursor/metal mixture, said selected amount being selected so as to provide stoichiometrically equivalent amounts of said excess carbon and said refractory metal;
   forming said mixture into a preform of a propulsion component; and
   heating said preform so as to thermally degrade said carbon rich polymer precursor to produce said silicon carbide and said excess carbon, said excess carbon and said refractory metal reacting to form refractory metal carbide and provide said refractory carbide component.

2. The method of claim 1, wherein said refractory metal is selected from the group consisting of Hf, Ta, Ti, Si, W, Zr and mixtures thereof.

3. The method of claim 1, wherein said refractory metal has a melting temperature that is higher than the temperature at which said precursor thermally degrades.

4. The method of claim 1, wherein said providing step comprises dissolving said precursor in a solvent.

5. The method of claim 1, wherein said refractory metal is provided in powder form.

6. The method of claim 1, wherein said combining step comprises forming a substantially homogenous mixture of said carbon rich polymer precursor and said refractory metal.

7. The method of claim 1, wherein said refractory metal and said carbon rich polymer precursor are mixed so as to provide a molar ratio of excess carbon to refractory metal of about 1.

8. The method of claim 1, wherein said heating step comprises heating said mixture to a temperature of at least about 1000° C.

9. The method of claim 1, wherein said heating step comprises heating said mixture to a temperature of at least about 1200° C.

10. The method of claim 1, wherein said carbon rich polymer precursor comprises a mixture of at least two polymer precursors to silicon carbide and excess carbon.

11. The method of claim 1, wherein said carbon rich polymer precursor comprises a first precursor to silicon carbide and a second precursor to carbon.

12. The method of claim 1, wherein said carbon rich polymer precursor comprises a preceramic polymer.

13. The method of claim 1, wherein said carbon rich polymer precursor comprises polymethylvinylsilane.

14. The method of claim 1, wherein said forming step comprises shaping said mixture into said preform.

15. The method of claim 1, wherein said forming step comprises infiltrating said mixture into a fiber preform of said propulsion component so as to provide said preform.

16. The method of claim 15, wherein said fiber preform is selected from the group consisting of continuous, non-continuous, woven, nonwoven, and braided structures of material selected from the group consisting of ceramic and carbon fibers and mixtures thereof.

17. The method of claim 15, wherein said fiber preform is a woven or braided structure of substantially continuous carbon fiber.

18. The method of claim 1, wherein said heating step is carried out by increasing temperature at a rate of about 1–10° C. per minute.

19. The method of claim 1, wherein said heating step is carried out by increasing temperature to a desired temperature and holding said desired temperature for at least 0.5 hours.

20. The method of claim 19, wherein said desired temperature is held for between about 0.5 and about 5 hours.

21. The method of claim 19, wherein said desired temperature is held for about 2 hours.

* * * * *